United States Patent [19]

Morris et al.

[11] Patent Number: 5,027,868
[45] Date of Patent: Jul. 2, 1991

[54] VAPOR RECOVERY SYSTEMS

[75] Inventors: John M. Morris, Auburn; Alan K. Forsythe, Vashon Island, both of Wash.

[73] Assignee: GT Development Corporation, Tukwila, Wash.

[21] Appl. No.: 207,002

[22] Filed: Jun. 15, 1988

Related U.S. Application Data

[63] Continuation of Ser. No. 946,698, Dec. 23, 1986, Pat. No. 4,714,172.

[51] Int. Cl.⁵ ............................................. B01D 53/04
[52] U.S. Cl. ..................................... 141/59; 141/302; 220/85 OVS; 220/85 OVR; 220/DIG. 33; 137/587; 55/168
[58] Field of Search ...................... 141/59, 302, 44–46, 141/301–305; 220/85 VR, 85 VS, 86 R, DIG. 33; 137/587–589; 55/165–168

[56] References Cited

U.S. PATENT DOCUMENTS

| | | | |
|---|---|---|---|
| 4,157,104 | 6/1979 | Lofquist, Jr. ........................ | 141/292 |
| 4,630,749 | 12/1986 | Armstrong et al. ................ | 220/86 R |
| 4,651,889 | 3/1987 | Uranishi et al. ................... | 220/85 VR |
| 4,706,708 | 11/1987 | Fornoto et al. .................... | 137/588 |
| 4,714,172 | 12/1987 | Morris .............................. | 220/86 R |
| 4,715,509 | 12/1987 | Ito et al. ........................... | 220/86 R |
| 4,770,677 | 9/1988 | Harris ................................ | 55/168 |
| 4,809,863 | 3/1989 | Woodcock ......................... | 220/85 F |

OTHER PUBLICATIONS

"Onboard Control of Refueling Emissions", *SAE Technical Paper Series*, by George S. Musser and Hugh F. Shannon, Oct. 6–9, 1986, No. 861560.

"Vehicle Onboard Control of Refueling Emissions-System Demonstration on a 1985 Vehicle", *SAE Technical Paper Series*, by W. J. Koehl, D. W. Lloyd, and L. J. McCabe, Oct. 6–9, 1986, No. 861551.

*Primary Examiner*—Ernest G. Cusick
*Attorney, Agent, or Firm*—Joan H. Pauly; Delbert J. Barnard

[57] ABSTRACT

A fill tube (12) leading into a fuel tank (10) is provided with a normally closed closure door (20) and a fill nozzle seal (24, 26, 30) spaced outwardly of the closure door (20). When liquid fuel is to be added to the fuel tank (10) a fill nozzle (32) is inserted through the fill nozzle seal (24, 26, 30). A seal element (30) engages the outside diameter of the fill nozzle (32) and seals against vapor leakage between the seal element (30) and the fill nozzle (32). Further insertion of the fill nozzle (32) into the fill tube (12) moves the end of the fill nozzle (32) against the closure door (20) opening the closure door (20). When this happens, fuel vapor within the fuel tank (10) flows through an opening (18) that is normally closed by the closure door (20), to and through an outlet (36) leading from a chamber (34) that is between the fill nozzle seal (24, 26, 30) and the closure door (20). The vapor flows from the chamber (34) into and through a vapor recovery passageway which leads to a vapor storage device (38). Liquid fuel being introduced into the fuel tank (10) displaces vapor from the fuel tank (10) through the vapor recovery passageway to the vapor storage device (38).

14 Claims, 4 Drawing Sheets

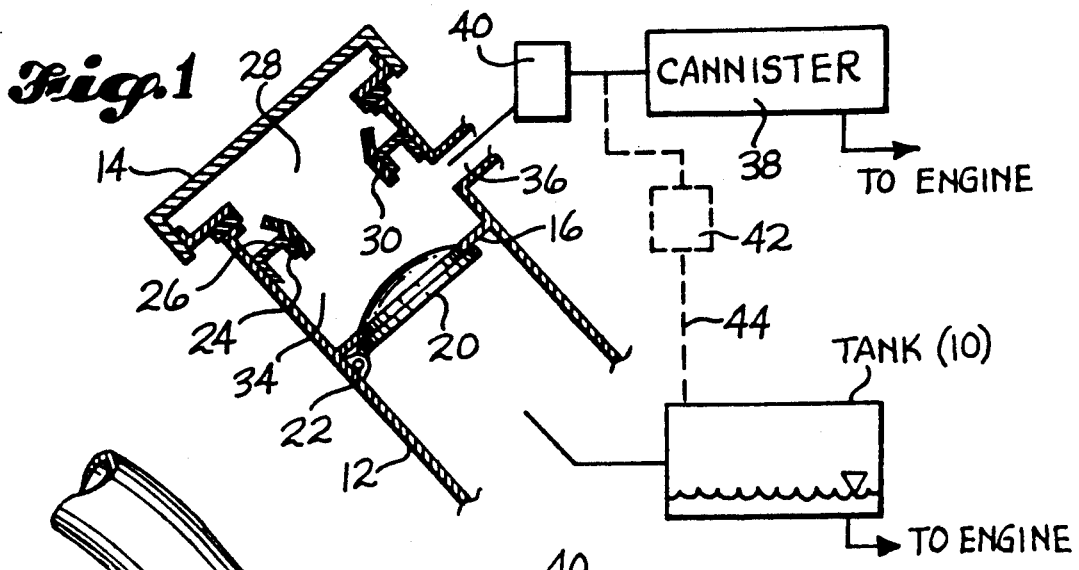
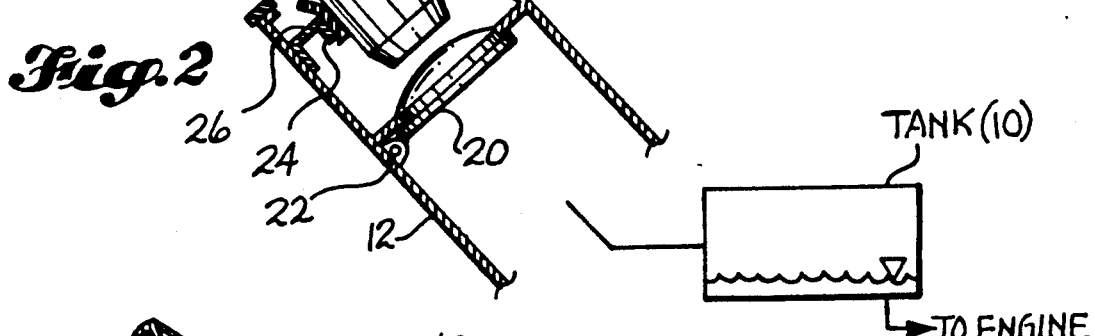
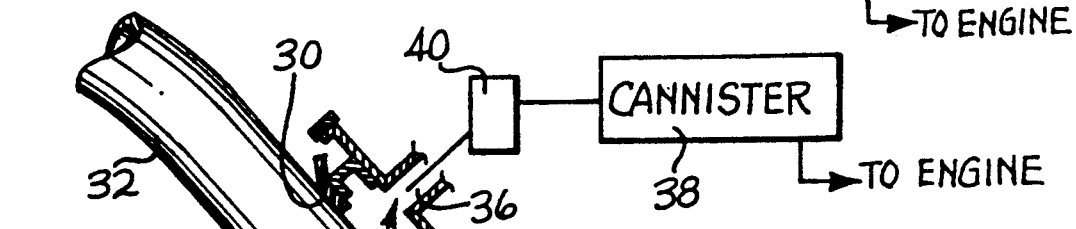
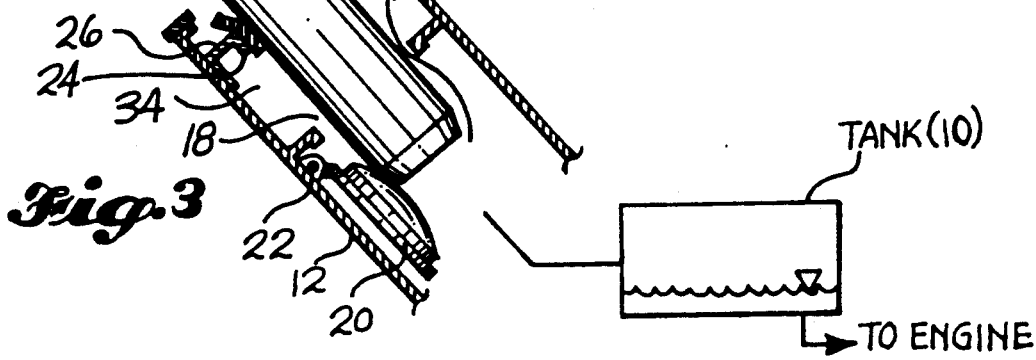

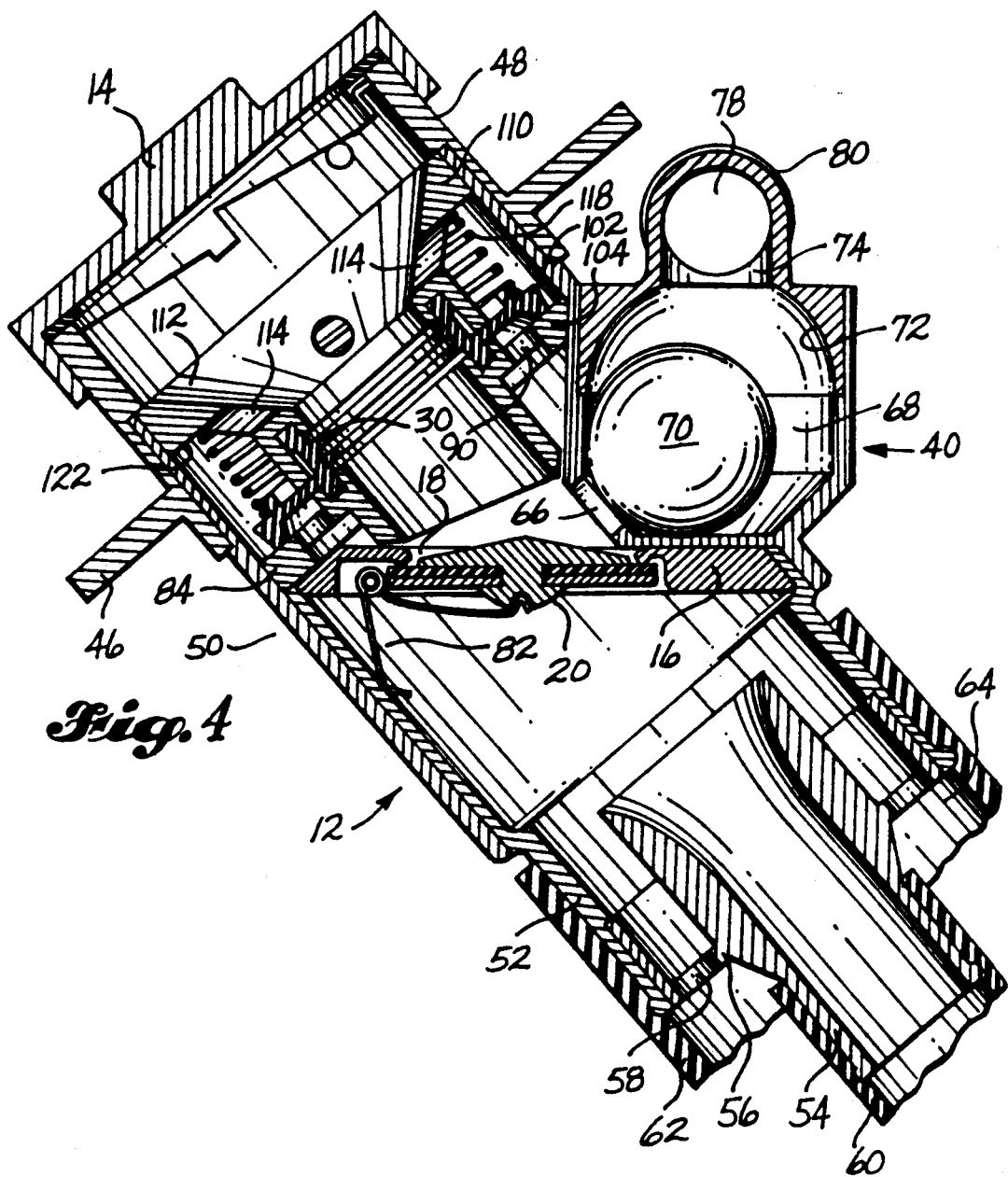

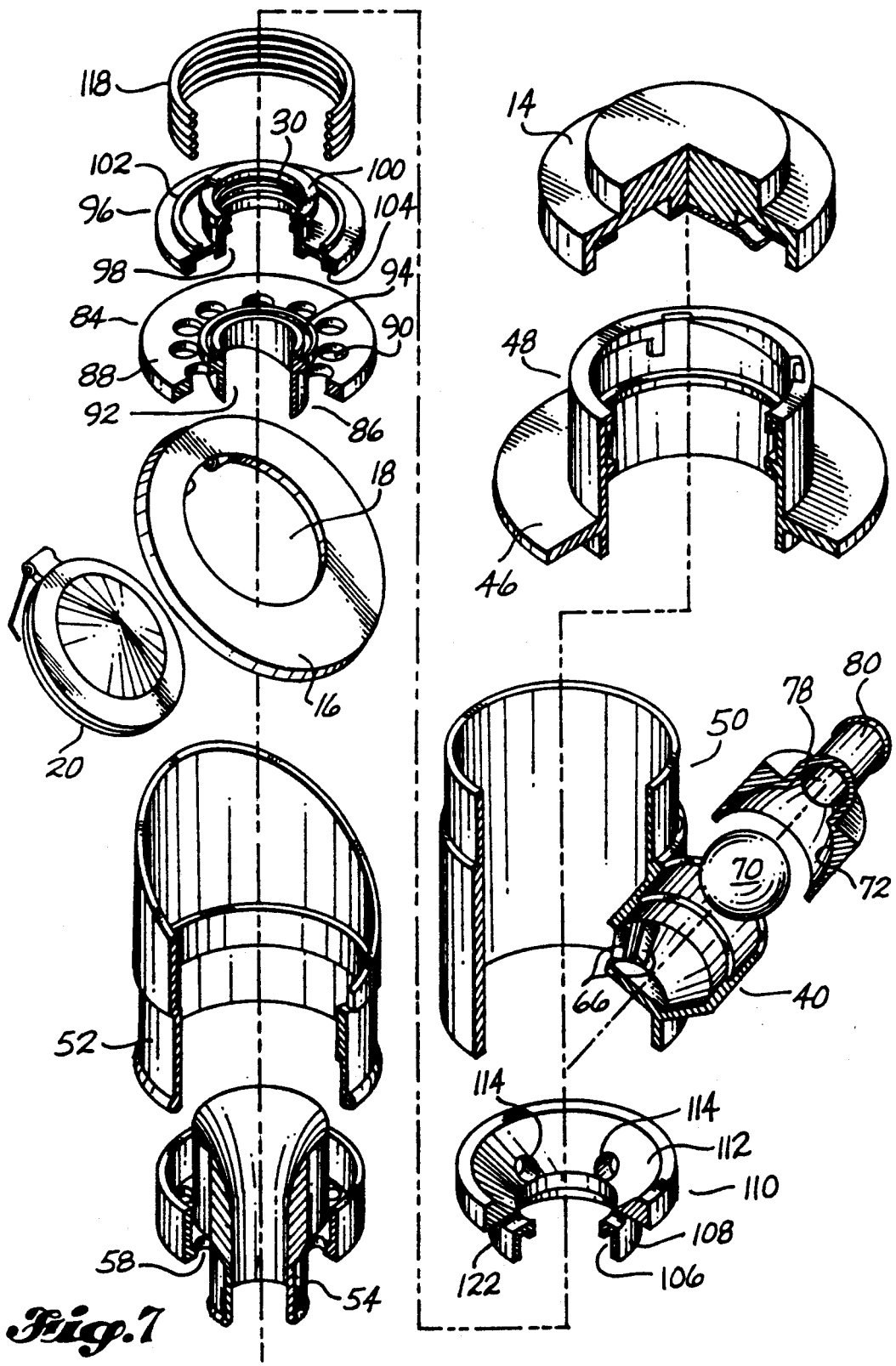

VAPOR RECOVERY SYSTEMS

This application is a continuation of application Ser. No. 946,698 filed Dec. 23, 1986, now U.S. Pat. No. 4,714,172.

TECHNICAL FIELD

The present invention relates to refueling vapor recovery systems for liquid fuel tanks. More particularly, it relates to the provision of an onboard refueling vapor recovery system in which stored vapors are recovered as well as vapors displaced by liquid fuel introduction into the fuel tank.

BACKGROUND ART

There are emission control systems presently in use which recover vapors generated during normal operating conditions. Fuel agitation, heating and expansion necessitate that the tank be vented to insure reasonable pressure limits. In the known systems the vented vapors are either fed directly to the engine or are first stored in a storage container and then later withdrawn from the container and fed to the engine.

Others have investigated ways of recovering vapor during a refueling operation. Example systems are disclosed in SAE Technical Paper Series, No. 861551, by W.J. Koehl, D. W. Lloyd and L. J. McCabe, entitled "Vehicle Onboard Control of Refueling Emissions - System Demonstration on a 1985 Vehicle"; and in SAE Technical Paper Series, No. 861560, by George S. Musser and Hugh F. Shannon, entitled "Onboard Control of Refueling Emissions." It has also been proposed that a sensor be positioned adjacent a door positioned over a closure cap on a fuel fill tube leading into a fuel tank. The sensor senses the opening of the door and connects a source of vacuum to a valve in a vent line, causing the valve to open and allow the flow of vapor from the fuel tank to a storage container.

A principal object of the present invention is to provide an onboard vapor recovery system which is operable during refueling and which is extremely simple and does not require the use of door sensors, a source of vacuum, etc.

The vapor recovery systems of the invention are combinable with the aforementioned emission control systems which recover vapors during normal operating conditions.

The vapor recovery systems of the invention may (and preferably do) utilize vapor/liquid discriminators and normal vent/rollover valves of a type covered by U.S. Pat. No. 4,325,398, granted Apr. 20, 1982, and entitled Safety and Venting Valves for Fuel Tanks Carried on Vehicles; by U.S. Pat. No. 4,457,325, granted July 3, 1984, and entitled Safety and Venting Cap for Vehicle Fuel Tanks; and by U.S. Pat. No. 4,487,215, granted Dec. 11, 1984, and entitled Gas Venting Valve.

The vapor recovery systems of the invention are characterized by extreme simplicity. Each comprises a small number of inexpensive and highly reliable components. The systems preferably involve a modular design resulting in an ease of installation and lower production costs. The systems are easily adaptable to existing fuel tank systems on vehicles. The necessary modifications to the existing tank components are minimal. There is no interference with the operation of the automatic shut-off systems which are a part of most refueling systems in use today.

DISCLOSURE OF THE INVENTION

A conventional liquid fuel tank includes a fill tube (or "fuel tube") into which a liquid fuel nozzle (or "fill nozzle") introduction of liquid fuel into the fuel tank, and a removable closure cap for the fill tube. In basic form, a refueling vapor recovery system incorporating the invention includes such a liquid fuel tank, a vapor storage means, a vapor recovery passageway extending from the fill tube to the vapor storage means, and vapor valve means within the fill tube.

In accordance with the present invention, the vapor valve means comprises a closure door within the fill tube which is movable inwardly from a closed position, to an open position. The door is normally biased into its closed position. The door is positioned to be contacted by the fill nozzle when the fill nozzle is inserted into the fill tube. Insertion of the fill nozzle into the fill tube and against the door moves the door into its open position. A fill nozzle seal is positioned in the fill tube between the closure door and the closure cap. The seal includes an opening through which the fill nozzle is inserted. A sealing means surrounds the opening and engages the fill nozzle, for sealing between the sealing means and the fill nozzle when the fill nozzle is within the fill nozzle seal. The inlet for the vapor recovery passageway is positioned within the fill tube between the closure door and the fill nozzle seal. Owing to this arrangement, the closure door prevents flow of vapor out from the fuel tank through the fill tube to the vapor recovery passageway when the closure door is closed. In use, the closure cap is removed from the fill tube. Then, the fill nozzle is inserted into the fill tube through the fill nozzle seal. The sealing means engages the fill nozzle and closes any passageway out to the atmosphere before the inner end of the fill nozzle contacts the closure door. The fill nozzle is then moved further into the fill tube and against the closure door, opening such door. This allows stored vapor to flow outwardly through the opening that was once closed by the closure door. The sealing contact between the sealing means of the fill nozzle seal prevents this stored vapor from escaping to the atmosphere. It instead flows into the vapor recovery passageway. The introduction of liquid fuel into the fuel tank then functions to displace vapor out from the vapor space of the fuel tank, through the fill tube and then through the vapor recovery passageway, to the vapor storage means.

In preferred form, a vapor/liquid discriminator is positioned within the vapor recovery passageway. Preferably, the vapor/liquid discriminator is incorporated into an outer portion of the fill tube.

According to an aspect of the invention, a relief valve is incorporated into the outer portion of the fill tube. Such relief valve may comprise a valve seat concentrically surrounding the fill nozzle seal. In preferred form, the closure member for the relief valve is an annular flange which extends radially outwardly from a region immediately surrounding the fill nozzle seal, on one side of the valve seat. A spring means is provided for urging a sealing lip portion of the flange into sealing engagement with the valve seat. A pressure acting on the flange in opposition to the spring force, of sufficient magnitude to overcome the spring force, will bend the flange away from the valve seat and open a vent passageway between the sealing lip and the valve seat.

3

Other more detailed features of the invention are hereinafter described as a part of the description of the best mode of the invention.

BRIEF DESCRIPTION OF THE DRAWINGS

Like reference numerals are used to designate like parts throughout the several views of the drawings, and:

FIG. 1 is a schematic view of a refueling vapor recovery system incorporating the present invention, such view showing a closure cap on a fill tube leading into a liquid fuel tank, and a closure door within the fuel tube in a closed position blocking flow of vapor out from the fuel tank through the fill tube past the closure door;

FIG. 2 is a view like FIG. 1, showing the closure cap removed, and showing the start of insertion of a fill nozzle into a fill nozzle seal that is positioned within the fill tube outwardly of the closure door, such view showing that the fill nozzle seal seals between itself and the fill nozzle as soon as the fill nozzle is inserted into it;

FIG. 3 is a view like FIGS. 1 and 2, but showing the fill nozzle inserted further into the fill tube, showing the closure door held open by the fill nozzle, and showing vapor venting from the fuel tank through a sidewall opening in the fill tube into a vapor vent passageway which leads to a vapor storage means;

FIG. 4 is a longitudinal sectional view of a fill tube assembly, with an inner end portion broken away, and with the closure cap shown spaced from the outer end of the fill tube, and showing a closure door within the fuel tube in a closed position;

FIG. 7 is an exploded isometric view of the components of the fill tube outer end assembly.

BEST MODE FOR CARRYING OUT THE INVENTION

Figures 5, 6:
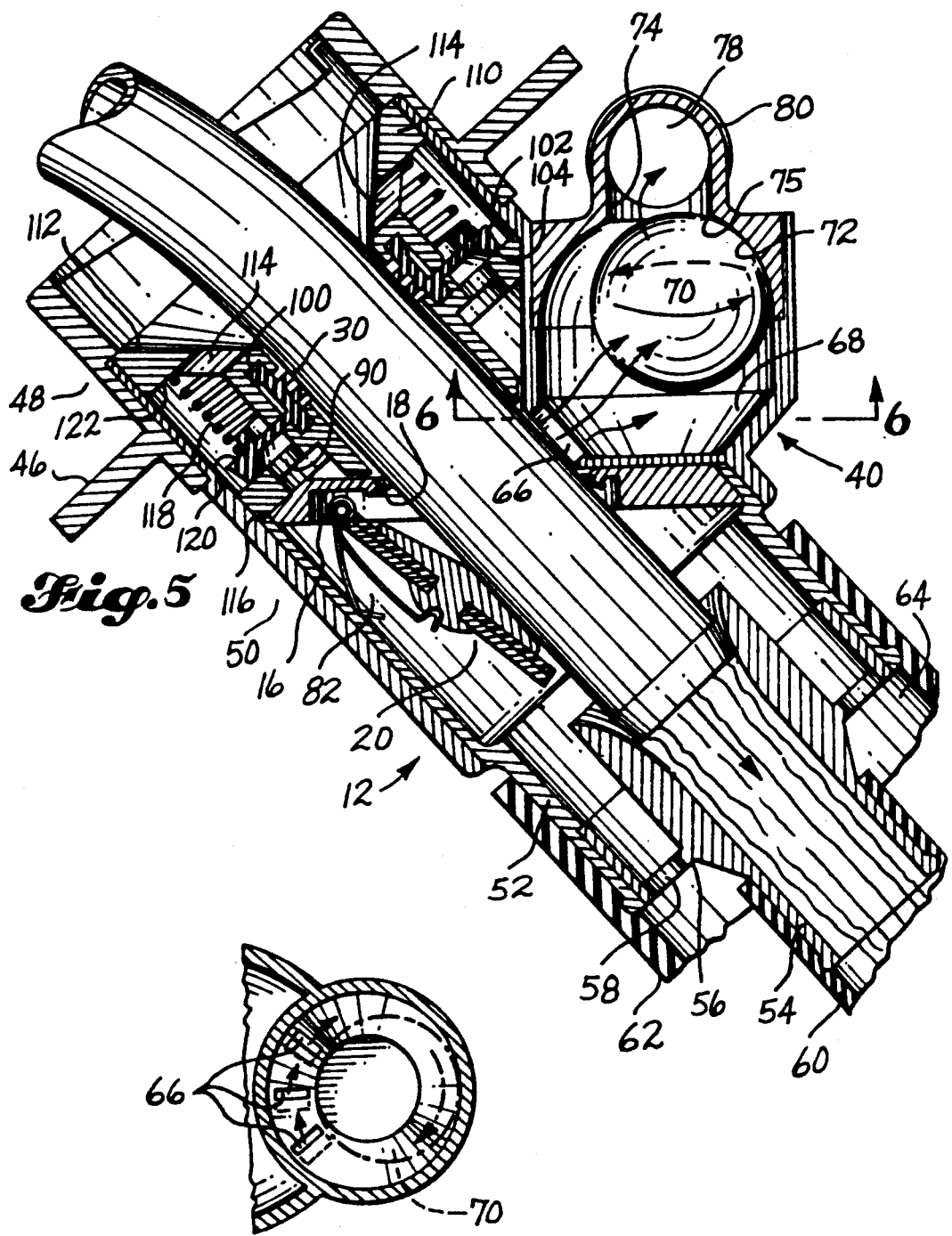
FIG. 5 is a view like FIG. 4, but showing an end portion of a fuel nozzle inserted into the fuel tube, through the fill nozzle seal, to contact and open the closure door, and showing liquid fuel being delivered by the fill nozzle into a central portion of the fill tube and vapor flowing out from the fill tube to and through a vapor/liquid discriminator, and showing the vapor acting on a closure ball and causing it to spin as the vapor flows through the vapor/liquid discriminator.
FIG. 6 is a sectional view taken substantially along line 6—6 of FIG. 5.

Referring to FIGS. 1-3, in basic form the vapor recovery system of the invention comprises a liquid fuel tank 10 including a fill tube (or "fuel tube") 12 having a removable closure cap 14. A transverse wall 16 is located in an outer portion of the fill tube 12. Wall 16 includes an opening 18 (FIG. 3) which is normally closed by a closure door 20. Door 20 is hinge connected to a support at 22. A fill nozzle (or "fuel nozzle") seal 24 is positioned within the fuel tube 12 outwardly of the closure door 20 and inwardly of the closure cap 14.

Fill nozzle seal 24 includes a transverse wall 26 including a central opening 28 that is surrounded by a seal ring 30. Preferably, ring 30 is constructed from an elastomeric material. The opening 28 is sized to snugly receive the fuel nozzle (or "fill nozzle") 32. When the fuel nozzle 32 is within the opening 28, its sidewall contacts the seal ring 30. The seal ring 30 seals against any substantial flow of vapor out through the opening 28, between the fill nozzle 32 and the seal ring 30.

A chamber 34 is defined between fill nozzle seal 24 and the closure door 20. Chamber 34 includes an outlet 36. A vapor vent passageway extends from this outlet 36 to a vapor storage means which may be a canister 38. A vapor/liquid discriminator 40 is preferably located in the vapor recovery passageway.

The system may also include a normal vent/rollover valve within a separate passageway leading from the fuel tank 10 to the vapor storage means 38. A normal vent/rollover valve 42 is shown in FIG. 1, in a conduit 44 which extends from tank 10 to an inlet leading into the vapor storage means 38. FIG. 1 shows that the refueling vapor recovery system of the present invention does not in any way interfere with the normal operation of the normal vent/rollover valve system.

Preferably, the vapor/liquid discriminator 40 and the normal vent/rollover valve 42 are constructed to utilize the invention shown by U.S. Pat. No. 4,325,398, granted Apr. 20, 1982, to Charles J. Green, and/or by U.S. Pat. No. 4,487,215, granted Dec. 11, 1984, also to Charles J. Green. The purpose and function of the normal vent/rollover valve 42 is well discussed in these two patents and for that reason will not be repeated in this document.

An embodiment of the vapor/liquid discriminator 40 is hereinafter described in connection with FIGS. 4-7.

Referring to FIG. 1, when the closure cap 14 is installed the closure door 20 is in a closed position. Closure door 20 blocks the flow of vapor from fuel tank 10 out through the fill tube 12, past the closure door 20. During this phase of operation the normal vent/rollover valve 42 functions to prevent pressure build-up in the fuel tank. Valve 42 opens in response to vapor flow through it and allows vapor flow from the tank 10 to the passageway 44 into the canister 38.

Referring to FIG. 2, when it is desired to add liquid fuel to the fuel tank 10, the closure cap 14 is first removed. Then a fill nozzle 32 is inserted into the fill tube 12. FIG. 2 shows the end portion of the fill nozzle 32 entering into the opening 28. At this time the seal ring 30 snugly engages the outer sidewall of the fill nozzle 32, creating an effective seal between the seal ring 30 and the fill nozzle 32.

In use, the fill nozzle 32 is shoved further into the fill tube 12. It is moved against and past the closure door 20. As shown by FIG. 3, the nozzle 32 opens the closure door 20 as it moves through the opening 18. At this time an annular gap exists around fill nozzle 32, between it and the border of opening 18. Vapor within the fuel tank 10 can flow through this annular gap into the chamber 34. The snug engagement of the fill nozzle 32 within the seal ring 30 prevents vapor from flowing out through opening 28 into the atmosphere. Instead, the vapor flows through outlet 36 to and through the vapor/liquid discriminator 40 and then from it on to the vapor storage means 38. The introduction of liquid fuel into the fuel tank 10 displaces the vapor from the fuel tank 10 out through the fuel tube 12, through the annular gap between the border of opening 18 and fill nozzle 32, and through the vapor recovery passageway. It is not necessary to add any other form of energy to the system.

Liquid fuel may be introduced into the fuel tank 10 until the tank is full and the liquid fuel rises up in the fuel tube 12 and into the fuel nozzle 32, tripping an automatic turn-off mechanism that is a customary part of the fuel nozzle 32. If for some reason liquid fuel should flow through the annular gap surrounding fill nozzle 32 and into the vapor recovery passageway (e.g. nozzle 32 has no automatic shut-off or has one that does not work), the liquid/vapor discriminator 40 will function to close the passageway so that liquid fuel will not be delivered to the vapor storage means 38.

Following refueling the fill nozzle 32 is withdrawn from the fill tube 12. This allows the closure door 20 to swing back into a closed position. The closure cap 14 is then reinstalled onto the fill tube 12. At this time the system is back to the condition illustrated by FIG. 1.

The fuel vapors that are stored in the vapor storage means 38 are, during operation of the vehicle, withdrawn from the fuel storage means 38 and burned in the engine. This part of the system is known per se and is not a part of the present invention. The fuel storage means which are in use today are termed "canisters" by the industry and for that reason the legend canister is used in FIGS. 1-3.

Referring to FIGS. 4-7, the fill tube 12 may include an outer portion constructed from metal, having a mounting flange 46. In this embodiment, a short tubular portion 48 extends axially outwardly from the mounting flange 46. A substantially larger tubular body 50 extends inwardly from the mounting flange 46. The inner end of body 50 reduces down to a smaller diameter portion 52 which in turn reduces down to a yet smaller diameter portion 54. A transition wall 56 extends between tubular portion 52 and tubular portion 54. As shown by FIG. 5, vapor openings 58 are formed in the transition wall 56. The outer end of a first hose 60 slips over the tubular end portion 54. This hose 60 extends into the fuel tank. The outer end of a second larger diameter hose 62 slips over the tubular portion 52. Hose 62 also extends into the fuel tank. Hose 62 concentrically surrounds hose 60, and an annular passageway 64 is defined by and between the two hoses 60, 62. Liquid fuel being introduced into the fuel tube 12 flows through the central part of the tubular body 50 and into the hose 60. The displaced vapor leaving the fuel tank then flows out through the annular passageway 64, through the openings 58, into a sidewall region of the tubular body 50 surrounding the central region.

As shown by FIG. 5, when the closure door 20 is open, the vapors flow to and through inlet vanes 66 which are a part of the vapor/liquid discriminator 40. These vanes 66 are set at an angle so that they impart a swirling movement to the vapor as the vapor passes through them into the interior chamber 68 of the vapor/liquid discriminator 40. A closure ball 70 is located within the chamber 68. It is relatively lightweight and buoyant. The spinning stream of vapor flowing through the chamber 68 acts on the closure ball 70, causing it to spin or orbit in position about the chamber sidewall 72. Sidewall 72 gradually decreases in diameter as it extends from a maximum diameter region near the center of chamber 68 out to an outlet orifice 74 which is bordered by a ball seat 75. As explained in the aforementioned U.S. Pat. No. 4,325,398 and No. 4,487,215, the vapor stream acting on the spinning closure ball 70 wants to move it towards the outlet orifice 74. The decreasing diameter of sidewall 72 causes the closure ball 70 to spin faster as it approaches the outlet orifice 74. As a result, the closure ball 70 does not seat in response to vapor flow through the chamber 68 but rather, the outlet orifice 74 remains open. However, if any liquid rises up in chamber 68, it will immediately float the closure ball 70 up into a seated position, closing the outlet orifice 74. The liquid will then flow out through the upper end of the fill tube 12, signaling the person who is handling the fill nozzle 32 that the refueling has been accomplished.

The outlet orifice 74 communicates with a passageway 78 within a nipple 80. Nipple 80 is connectable to one end of a hose which extends from the vapor/liquid discriminator 40 to the vapor storage means 38.

Referring to FIGS. 4 and 5, a spring 82 may be arranged to normally bias the closure door 20 into a position closing the opening 18 in wall 16.

Referring to FIGS. 4, 5 and 7, the outer end portion of the fill tube assembly 12 may comprise a plurality of inserts. A first insert 84 comprises a short tubular portion 86 formed integral with an annular flange 88. Vent openings 90 are formed in and spaced around the flange 88. Tubular portion 86 includes a central opening 92. A shallow socket 94 surrounds the upper end of the opening 92. A washer shaped member 96 constructed from an elastomeric material includes a lower tubular flange 98 which fits down into the socket 94. It also includes an upper tubular flange 100. Member 96 includes a radial flange 102 which in turn includes an annular lip 104.

The tubular flange 100 fits within a socket 106 formed at the lower end of a tubular portion 108 of an insert 110. Insert 110 includes a conical wall 112 which decreases in diameter from its outer end to its inner end and at its inner end is joined to the cylindrical wall 108. A plurality of openings 114 are formed in the conical wall 112.

As shown by FIGS. 4 and 5, the member 84 is inserted into the fill tube first. Its radial flange 88 rests on a shoulder 116. The elastomeric member 96 sits on member 84, with its lower tubular flange 98 within the socket 94. Then the member 110 fits down on the member 96, with the socket 106 at its lower end engaging the upper tubular flange 100 of member 96. A compression spring 118 is located between an outer peripheral portion 120 of the member 96 and a shoulder 122 formed on member 110. As shown by FIGS. 4 and 5, the compression spring 118 biases the radial flange 102 against the radial flange 88. The contact made between lip 104 and radial flange 88 seals against gas leakage between these members.

The center portion of member 96, including the tubular flanges 98, 100, forms the fill nozzle seal ring 30. This center portion may include circumferential lips which engage the outside diameter of the fill nozzle 32.

The elastomeric flange 102, the hard material flange 88 and the compression spring 118 together define a pressure relief valve. A spring force is selected which can be overcome by an overpressure condition acting on the lower side of flange 102. Such overpressure will bend the flange 102 upwardly, compressing the spring 118, and opening an avenue between the lip 104 and the flange 88. The pressure is vented out through this avenue.

If a fill nozzle 32 is within the fill tube 12 delivering liquid fuel into the fuel tank, and for some reason liquid fuel should rise in the fill tube 12 a sufficient amount to lift ball 70 into a seated position, and liquid fuel is thereafter delivered into the fill tube 12, such liquid fuel will bend the flange 102 upwardly, flow through openings 114, and out the outer end of the fill tube 12, indicating to the operator that fuel delivery should be stopped.

The embodiments which are disclosed are submitted as examples only. The scope of the invention is not to be determined by these examples, but rather by the claims that follow, interpreted in accordance with the rules of patent claim interpretation, including use of the doctrine of equivalents.

What is claimed is:

1. A refueling vapor recovery system comprising:
   a liquid fuel tank including a fill tube into which a liquid fuel nozzle is inserted for introduction of liquid fuel into said fuel tank; said fill tube having an outer end and defining a first opening spaced inwardly of said end;
   a removable closure cap for the fill tube;
   a closure door within the fill tube movable inwardly from a closed position in which it closes said first opening, to an open position;
   means normally biasing the closure door into its closed position, said door being positioned to be contacted by the fuel nozzle when the fuel nozzle is inserted into the fill tube, and moved by said fuel nozzle into its open position;
   a fuel nozzle seal in said fill tube positioned between said first opening and said closure cap; said seal including a second opening through which the fuel nozzle is inserted, and sealing means surrounding said second opening for engaging the fuel nozzle and sealing between said sealing means and the fuel nozzle; and said first opening being dimensioned to receive said fuel nozzle and to be substantially larger than the outside diameter of the fuel nozzle, so that a gap is defined around the fuel nozzle when it is inserted through said first opening;
   a vapor storage means; and
   a vapor recovery passageway extending from a location within the fill tube, between said first opening and the fuel nozzle seal, to the vapor storage means;
   wherein said closure door prevents flow of vapor out from the fuel tank through the fill tube to the vapor recovery passageway when the closure door is closed; wherein an insertion of a fuel nozzle through the fuel nozzle seal and against the closure door, following a removal of the closure cap, will open the closure door and allow vapor to flow out from the fuel tank through the fill tube, through said gap to said location, and to and through the vapor recovery passageway to the vapor storage means, and at the same time the engagement of the fuel nozzle within the fuel nozzle seal will prevent flow of vapor out from the fill tube into the atmosphere; and wherein liquid fuel being introduced into the fuel tank will displace vapor out from the fuel tank through the vapor recovery passageway to the vapor storage means.

2. A refueling vapor recovery system according to claim 1, wherein the fill tube includes wall means at a side thereof, laterally of a location within the fill tube between the closure door and the fuel nozzle seal; said wall means defining a housing in which a vapor/liquid discriminator is located; said vapor/liquid discriminator including an interior chamber, an outlet orifice surrounded by a ball seat, a closure ball, and means for positioning the closure ball in the chamber spaced from the outlet orifice during vapor flow through the vapor/liquid discriminator; and wherein liquid flow into the chamber will act on the closure ball and move it into a seated position, closing the outlet orifice.

3. A refueling vapor recovery system according to claim 2, wherein the means for positioning the closure ball comprises inlet means oriented to swirl the vapor as it enters into the chamber, and sidewall means decreasing in diameter from a maximum diameter down to a minimum diameter adjacent the ball seat, with the swirling vapor causing the closure ball to orbit about the sidewall means.

4. A refueling vapor recovery system according to claim 1, comprising a relief valve positioned to open in response to an over pressure within the fill tube on the fuel tank side of the fuel nozzle seal.

5. A refueling vapor recovery system according to claim 4, wherein said relief valve comprises a valve seat concentrically surrounding the fuel nozzle seal, an annular flange constructed from an elastomeric material including a sealing lip directed towards the valve seat, spring means acting on the flange to urge the sealing lip into sealing engagement with the valve seat, and fluid passageway means radially inwardly of the valve seat, communicating a side surface of the flange that is opposite the spring with the interior of the fill tube.

6. A refueling vapor recovery system comprising:
   a fill tube attachable to a fuel tank, said fill tube having inner and outer ends;
   a transverse wall within said fill tube having an opening;
   a closure door inwardly of said wall;
   means pivotally mounting the closure door for pivotal movement towards and away from said wall;
   spring means normally biasing the closure door into a closed position against said wall, and allowing the closure door to swing from said closed position towards the inner end of the fill tube, to open the opening in said transverse wall;
   a fuel nozzle seal in said fill tube spaced axially outwardly from the transverse wall and closure door; said fuel nozzle seal including an opening, and a seal element surrounding said opening in the fuel nozzle seal; said seal element being sized to snugly receive a fuel nozzle, with the seal element making sealing engagement with the outside diameter of the nozzle;
   said transverse wall and said closure door being located closely enough adjacent the fuel nozzle seal such that a fuel nozzle inserted through said seal can contact the closure door and when inserted an additional amount will swing the closure door into an open position;
   said opening in the transverse wall being substantially larger than the outside diameter of the fuel nozzle, so that a vapor passageway is defined about said fuel nozzle; and
   a vapor outlet in a side portion of the fill tube, between the fuel nozzle seal and the transverse wall; said vapor outlet being in communication with a portion of the fill tube inward of the transverse wall, via said vapor passageway, when the closure door is opened by contact with a fuel nozzle.

7. A refueling vapor recovery system according to claim 6, wherein the fill tube includes wall means at a side thereof, laterally of a location within the fill tube between the closure door and the fuel nozzle seal; said wall means defining a housing in which a vapor/liquid discriminator is located; said vapor/liquid discriminator including an interior chamber, an outlet orifice surrounded by a ball seat, a closure ball, and means for positioning the closure ball in the chamber spaced from the outlet orifice during vapor flow through the vapor/liquid discriminator; and wherein liquid flow into the chamber will act on the closure ball and move it into a seated position, closing the outlet orifice.

8. A refueling vapor recovery system according to claim 7, wherein the means for positioning the closure ball comprises inlet means oriented to swirl the vapor as it enters into the chamber, and sidewall means decreasing in diameter from a maximum diameter down to a minimum diameter adjacent the ball seat, with the swirling vapor causing the closure ball to orbit about the sidewall means.

9. A refueling vapor recovery system according to claim 6, comprising a pressure relief valve positioned to open in response to an over pressure within the fill tube on the fuel tank side of the fuel nozzle seal.

10. A refueling vapor recovery system according to claim 9, wherein said pressure relief valve comprises a valve seat concentrically surrounding the fuel nozzle seal, an annular flange constructed from an elastomeric material including a lip directed towards the valve seat, spring means acting on the flange to urge the lip into sealing engagement with the valve seat, and fluid passageway means radially inwardly of the valve seat, communicating a side surface of the flange that is opposite the spring with the interior of the fill tube.

11. A refueling vapor recovery system according to claim 9, wherein the fill tube includes wall means at a side thereof, laterally of a location within the fill tube between the closure door and the fuel nozzle seal; said wall means defining a housing in which a vapor/liquid discriminator is located; said vapor/liquid discriminator including an interior chamber, an outlet orifice surrounded by a ball seat, a closure ball, and means for positioning the closure ball in the chamber spaced from the outlet orifice during vapor flow through the vapor/liquid discriminator; and wherein liquid flow into the chamber will act on the closure ball and move it into a seated position, closing the outlet orifice.

12. A refueling vapor recovery system according to claim 11, wherein the means for positioning the closure ball comprises inlet means oriented to swirl the vapor as it enters into the chamber, and sidewall means decreasing in diameter from a maximum diameter down to a minimum diameter adjacent the ball seat, with the swirling vapor causing the closure ball to orbit about the sidewall means.

13. A refueling vapor recovery system according to claim 12, wherein said pressure relief valve comprises a valve seat concentrically surrounding the fuel nozzle seal, an annular flange constructed from an elastomeric material including a lip directed towards the valve seat, spring means acting on the flange to urge the lip into sealing engagement with the valve seat, and fluid passageway means radially inwardly of the valve seat, communicating a side surface of the flange that is opposite the spring with the interior of the fill tube.

14. A refueling vapor recovery system according to claim 11, wherein said pressure relief valve comprises a valve seat concentrically surrounding the fuel nozzle seal, an annular flange constructed from an elastomeric material including a lip directed towards the valve seat, spring means acting on the flange to urge the lip into sealing engagement with the valve seat, and fluid passageway means radially inwardly of the valve seat, communicating a side surface of the flange that is opposite the spring with the interior of the fill tube.

* * * * *

UNITED STATES PATENT AND TRADEMARK OFFICE
CERTIFICATE OF CORRECTION

PATENT NO. : 5,027,868

DATED : July 2, 1991

INVENTOR(S) : John M. Morris and Alan K. Forsythe

It is certified that error appears in the above-identified patent and that said Letters Patent is hereby corrected as shown below:

On the cover page, under "Related U.S. Application Data", "Pat. No. 4, 714,172" should be --now abandoned--.

Col. 1. lines 5 and 6, "U.S. Pat. No. 4,714,172" should be --abandoned--.

Col. 2, line 5, after "nozzle")", insert -- is inserted for--.

Signed and Sealed this

Twenty-sixth Day of January, 1993

Attest:

STEPHEN G. KUNIN

*Attesting Officer*  *Acting Commissioner of Patents and Trademarks*